Patented June 9, 1925.

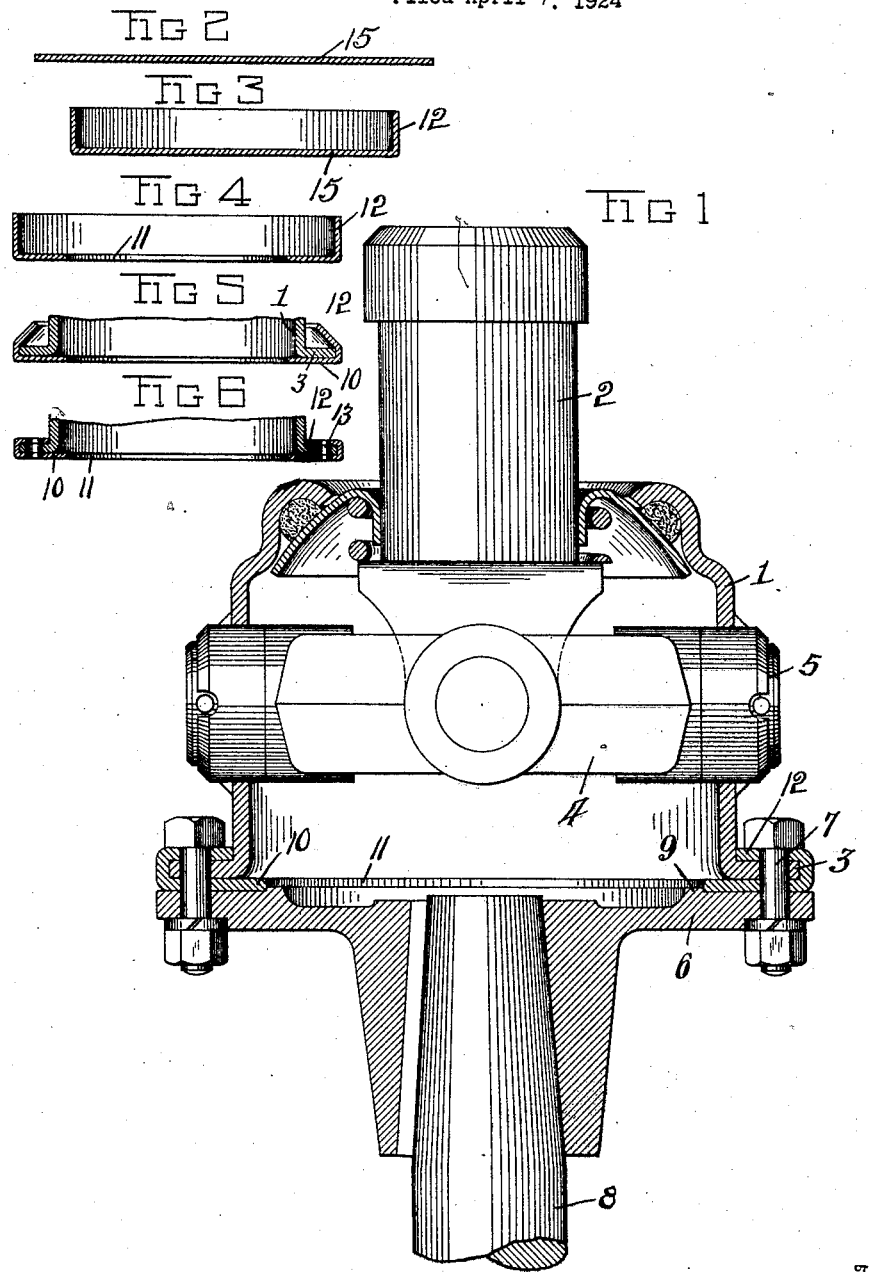

1,540,993

UNITED STATES PATENT OFFICE.

ADOLPH C. KLOPPING, OF TOLEDO, OHIO.

UNIVERSAL-JOINT CASING.

Application filed April 7, 1924. Serial No. 704,583.

*To all whom it may concern:*

Be it known that I, ADOLPH C. KLOPPING, a citizen of the United States, and a resident of Toledo, in the county of Lucas and State of Ohio, have invented a new and useful Universal-Joint Casing, which invention is fully set forth in the following specification.

This invention relates to universal joints for shafts or the like.

In the recent manufacture of joints of this character, the cast boxes or others used in connection therewith have to some extent been supplemented by stamped boxes or shells, thereby resulting in a considerable saving in expense. In making the stamped boxes, it has been necessary to provide the inner ends thereof with outwardly turned radial flanges to which the separate shaft attaching member of the box may be bolted. In order to form a pilot edge on the inner end of the box member for centering with the companion shaft attaching member, the outwardly turned flange has been made of sufficient length to be doubled back closely upon itself so that it reinforces the flange and its inwardly directing edge forms the desired pilot guide for the companion box member.

The turning back of the metal in this manner presents several difficulties in the manufacture of box members which renders the manufacture thereof difficult, impractical and expensive.

The object of the invention is to obviate the objections above noted in forming the box members of universal joints of sheet metal, and to enable such members to be provided in a simple, efficient and inexpensive manner with pilot edges for the other shaft carrying member of the box, and to enable the pilot opening to be varied as to size, as desired.

The invention is fully described, and while in its broader aspect it is capable of embodiment in different forms, a preferred embodiment thereof is illustrated in the accompanying drawings, in which, Figure 1 is a central longitudinal sectional view of a universal joint embodying the invention. Fig. 2 is a cross-sectional view of the pilot member in its original disk form. Fig. 3 is a similar view of the same after the first forming operation. Fig. 4 is a similiar view of the same after the next operation thereon in which the material is punched from the bottom thereof to form a central opening. Fig. 5 is a cross-sectional view thereof and of a portion of a universal joint box member after the first bending operation of the upward edge of the pilot member over the box flange, and Fig. 6 is a similar view thereof with the pilot member completely secured to the box flange and the bolt receiving holes provided in the two.

Referring to the drawings, 1 designates the box or cup member of a universal joint, which member is stamped in cup shape or substantially cylindrical in form from sheet metal, with one end drawn in and forming a restricted opening through which a shaft part 2 projects for limited universal movements relative to the box. The other end of the box has an annular out-turned radial flange 3. Nothing novel is claimed for the box construction except that the flange 3 does not have an integral portion turned back on its under side and closely pressed thereto for the purpose of forming a pilot edge or guide, as has heretofore been used.

The shaft section 2 is rockably connected within the box 1 to a companion rocker member 4, having trunnions 5 journaled in diametrically opposed relation in the box wall at right angles to the shaft section, as is well understood in the art.

The open end of the box 1, which has the flange 3, is closed by a plate 6, which is securely attached to the box end by bolts 7 extending through perforations in its marginal edge portions and the flange 3. The plate 6 is adapted to be fixed at its center to a shaft section 8 and is provided on its inner face with the customary pilot flange or annular guide rib 9, adapted to coact with a part of the box 1 to center the pilot relative thereto.

In carrying out my invention, I secure a flat ring plate 10 of sheet metal against the outer side of the flange 3 with its opening 11 centered with respect to the box axis. This ring plate is considerably larger in diameter than the flange 3, and is secured in position thereon by having its outer edge portion 12 turned upwardly and inwardly closely over the flange, as shown in Fig. 1, so that the body portion of the plate 10 and its flange 11 closely embrace the flange 3 of the box. After securing the ring plate in position on the box flange, the plate and flange are provided with perforations 13 at suitable intervals around the box to receive the bolts 7. The opening of the ring plate 10 is of suitable size or diameter to closely receive the pilot rib or flange 9 of the shaft plate 6 and thereby center the shaft plate with respect to the box axis. The pilot opening 11 may be cut or punched of a size to suit the size of the pilot rib 9 on the shaft plate 6, which latter may vary for different makes of shaft plates or for other reasons.

The method preferably employed in making and securing a pilot plate 10 to a box consists in first stamping from sheet metal a disk 15 (Fig. 2) of a size to extend a distance beyond the edge of the box flange entirely around the same, and then acting on the disk to turn up an annular edge flange 12 therearound to form the disk in cup shape. The bottom of the cup is then punched to provide the pilot opening 11. The flanged end 3 of the box 1 is then inserted in the cup thus formed and the next operation partially bends the upstanding flange 12 of the cup at substantially a 45° angle over the flange 3. The next operation completes the bending of the flange 12 down over the box flange after which the bolt receiving openings 13 are drilled or punched through the flange 3 and upper and lower embracing portions of the pilot member 10.

It is found in practice that by making the pilot member 10 separate from the box flange 3 and attaching the same thereto in the manner described, avoids the manufacturing objections instant to the method heretofore employed in connection with sheet metal boxes, and it also enables the pilot opening 11 to be formed of desired size to suit the pilot member with which it is to coact.

I wish it understood that my invention is not limited to any specific construction, arrangement or form of the parts as it is capable of numerous modifications and changes without departing from the spirit of the claims.

Having thus described my invention, what I claim as new and desire to secure by Letters Patent is:

1. In a universal joint having a driving housing provided with an outwardly turned flange, and a plate cooperating therewith and provided with a pilot, means for forming a pilot guide for said housing including a ring plate having a central opening therein adapted to fit said pilot, and having its outer edge clamped to said outwardly turned flange.

2. A universal joint including a driving housing having an outwardly turned flange at one end, a ring plate disposed flat against the outer side of said flange, and having its outer edge portion turned over the flange in embracing relation thereto, and having its inner edge centered with respect to the box axis and forming a pilot guide, whereby the ring plate may be clamped to the flange of said housing without displacing the inner edge of said plate, thereby to maintain the opening in the plate in accurate alignment with the axis of the housing.

3. A universal joint having a sheet metal driving housing provided with an out-turned flange at one end, a ring plate of sheet metal disposed flat against the outer side of said out-turned flange with its outer edge extending over the flange in close embracing relation thereto, the inner edge of the ring plate being centered with respect to the housing axis and forming a pilot guide, a shaft plate seating against the outer side of the ring plate and having a pilot rib for fitting into the ring plate opening, and bolts extending through the outer edge of the ring plate and shaft plate to secure the parts in assembled relation.

In testimony whereof I have hereunto signed my name to this specification.

ADOLPH C. KLOPPING.